US012810730B2

(12) United States Patent
Tescher et al.

(10) Patent No.: US 12,810,730 B2
(45) Date of Patent: Nov. 24, 2026

(54) AUTONOMOUS VEHICLE BOT ORCHESTRATOR

(71) Applicant: GM Cruise Holdings LLC, San Francisco, CA (US)

(72) Inventors: Matthew Tescher, Alameda, CA (US); Ritwik Devasish Roy, Sinking Spring, PA (US); Yining Zhao, Lake Forest, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 554 days.

(21) Appl. No.: 18/187,537

(22) Filed: Mar. 21, 2023

(65) Prior Publication Data

US 2024/0321109 A1 Sep. 26, 2024

(51) Int. Cl.

| | |
|---|---|
| ***G08G 1/00*** | (2006.01) |
| ***B60W 60/00*** | (2020.01) |
| ***G05D 1/00*** | (2006.01) |

(52) U.S. Cl.

CPC ....... *G08G 1/202* (2013.01); *B60W 60/00253* (2020.02); *B60W 60/00256* (2020.02); *B60W 60/005* (2020.02); *G05D 1/0027* (2013.01); *B60W 2520/06* (2013.01); *B60W 2530/00* (2013.01); *B60W 2540/049* (2020.02); *B60W 2556/45* (2020.02)

(58) Field of Classification Search

CPC .... G08G 1/202; G06Q 10/02; G06Q 10/0631; G06Q 50/47; B60W 60/00253; B60W 60/00256; B60W 60/005; B60W 2520/06; B60W 2530/00; B60W 2540/049; B60W 2556/45; G05D 1/227; G05D 1/6987; G05D 1/0027; G05D 2105/22; G05D 2107/13; G05D 2109/10

See application file for complete search history.

(56) References Cited

U.S. PATENT DOCUMENTS

| | | | | |
|---|---|---|---|---|
| 2019/0011931 | A1 * | 1/2019 | Selvam | G08G 1/123 |
| 2019/0050269 | A1 * | 2/2019 | Anderson | G06F 9/5077 |
| 2021/0182454 | A1 * | 6/2021 | Smaili | G06F 30/15 |
| 2022/0113737 | A1 * | 4/2022 | Kobayashi | B60W 60/001 |
| 2022/0230109 | A1 * | 7/2022 | Twumasi-Boakye | G06Q 10/06313 |

* cited by examiner

*Primary Examiner* — Nhi Q Bui

(74) *Attorney, Agent, or Firm* — Honigman LLP; Matthew H. Szalach

(57) ABSTRACT

Aspects of the disclosed technology provide solutions for autonomous vehicle (AV) testing and in particular, for providing a bot orchestrator to test various use cases on a fleet management system. A process of the disclosed technology can include steps for receiving, at a fleet management system, a first dispatch request, the first dispatch request indicating a first pick-up location and sending, from the fleet management system, a first dispatch command to an autonomous vehicle (AV). In some aspects, the process can further include steps for receiving, at a bot orchestrator, a first provisioning request, the first provisioning requesting specifying one or more AV parameters and instantiating, by the bot orchestrator, one or more AV bots based on the provisioning request. Systems and machine-readable media are also provided.

20 Claims, 6 Drawing Sheets

AUTONOMOUS VEHICLE BOT ORCHESTRATOR

BACKGROUND

1. Technical Field

The present disclosure generally relates to solutions for autonomous vehicle (AV) testing and in particular, for providing an AV bot orchestrator to test various use cases on a fleet management system for responding to AV ridehailing and delivery requests.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning, and obstacle avoidance.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
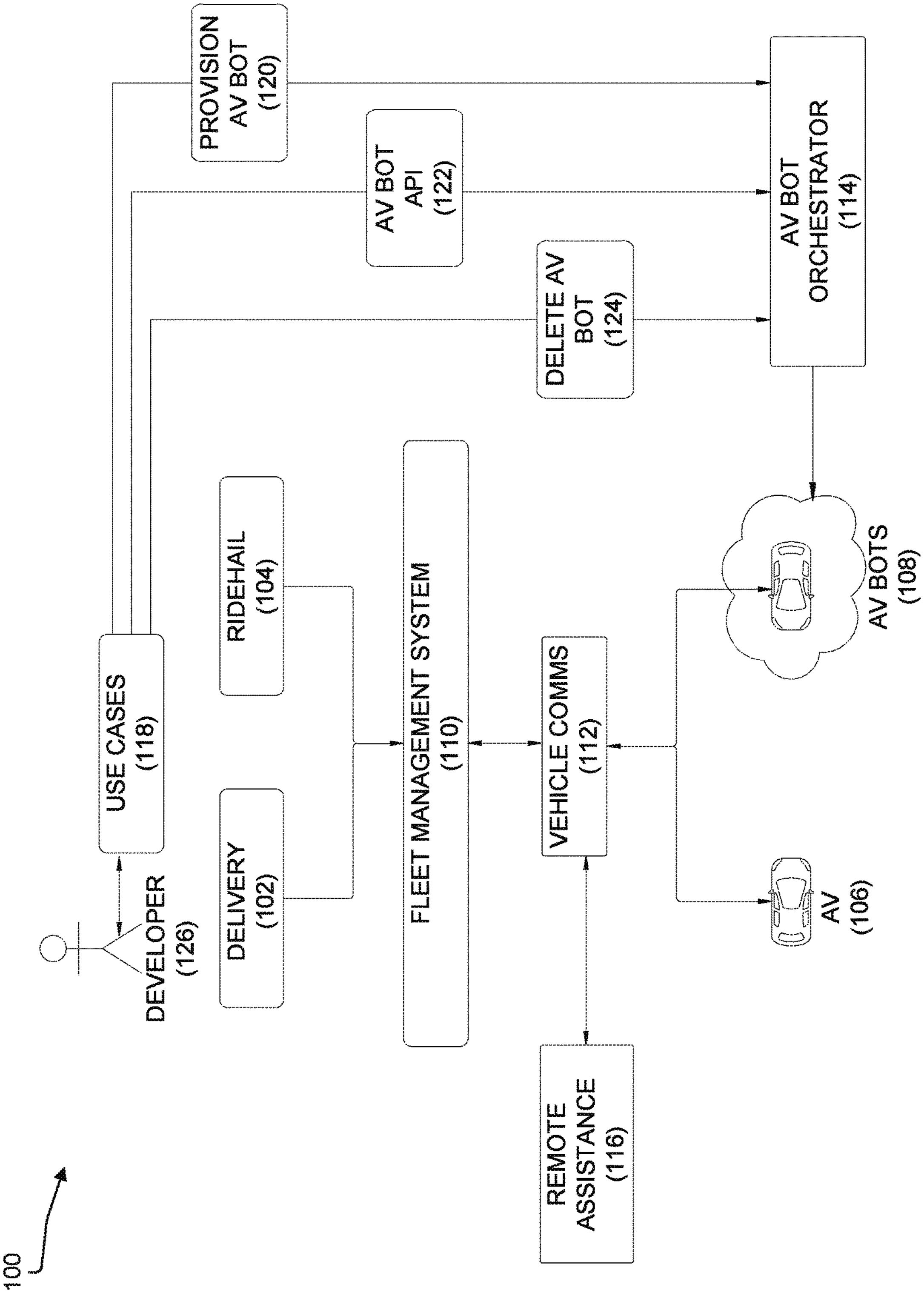
FIG. 1 illustrates an example system environment with an autonomous vehicle (AV) bot orchestrator and fleet management system, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicle (AV) ridehail and delivery systems are designed to provide a user a safe and convenient transportation or delivery service that may be requested via a smartphone application. In order to manage a fleet of AVs, a fleet management system (also AV fleet management system) may be used to allocate and dispatch AVs in response to user requests. For example, a fleet management system may allocate the nearest available AV in response to a user's ridehailing request. In some instances, the fleet management system may be unable to allocate an AV due to AV supply constraints, or other scenarios such as technical issues with one or more AVs in the fleet. In a situation such as a technical issue or a driving scenario that prevents the AV from autonomously navigating, the AV can be configured to request assistance from a Remote Assistance (RA) operator (also remote operator) that may provide support necessary to resolve the malfunction. By way of example, the AV fleet management system may encounter additional novel technical scenarios including, but not limited to, an AV door left open, a passenger left in the vehicle from a previous ride, or other examples that may impact the performance of the AV fleet management system.

To improve the performance of an AV fleet management system, it would be helpful to leverage a set of tools to test out different use cases that the fleet management system may encounter. Aspects of the disclosed technology provide solutions for testing a fleet management system using a bot orchestrator (also AV bot orchestrator), that can be used to instantiate (e.g., via software) AV bots that can interface with the same fleet management system which dispatches AVs (e.g., real-world AVs for ridehailing or delivery services). In some implementations, an Application Programming Interface (API) can be used to interrogate parameters (also AV parameters) from various use cases to configure the AV bots. For example, a stress test may involve the instantiation of many AV bots, e.g., to test the limitations of the fleet management system (e.g., how many AVs the fleet management system can service at one time). The AV bots can be created or deleted as needed based on the requirements of a particular use case. Various testing use cases are discussed in further detail below.

FIG. 1 illustrates an example system environment 100 with an autonomous vehicle (AV) bot orchestrator 114 and fleet management system 110. In the example of environment 100, fleet management system 110 can be configured to perform functions for allocating and dispatching one or more AVs 106 in response to a delivery 102 or ridehail 104 request. Delivery requests 102 can relate to the dispatch of one or more AV, e.g., for the purpose of delivering items, such as food or other packaged items. Ridehail requests 104 can relate to AV passenger requests, e.g., for transporting passengers from an indicated pick-up location or a drop-off location. Depending on the desired implementation, AV request use cases (102, 104) may include additional (or different) service request types, without departing from the scope of the disclosed technology. As described herein, AV 106 represents a real-world AV operating in a real-world (physical) environment and AV bots 108 represents software-based AVs that are created/instantiated and destroyed/deleted by AV bot orchestrator 114. Both AV 106 and AV bots 108 interface with the same fleet management system 110.

When a user requests a ridehail 104, fleet management system 110 can allocate an AV (e.g., AV 106) to the user for pick-up. The fleet management system 110 may communicate with AV 106 via vehicle communication system 112. In some instances, AV 106 may experience a technical issue or driving scenario preventing AV 106 from autonomously navigating. To resolve the problem, AV 106 may communicate (e.g., via vehicle communication system 112) with remote assistance system 116 which may contact a remote operator that can provide instructions to AV 106 to resolve the problem. By way of example, RA 116 may be contacted by AV 106 in the case of AV system malfunctions, such as if navigation functions become halted, and/or in the case of a collision, etc.

Communication between AV 106 and fleet management system 110 as illustrated above may also be implemented by one or more AV bots 108. In some aspects, bot orchestrator 114 can receive a provisioning request (e.g., provision AV bot 120) that is initiated, for example, by a user (e.g., an operator, or software developer that is conducting testing) 126 for a particular use case 118. An AV bot API 122 (which will be discussed in further detail in FIG. 2 below) may be used to configure AV bots 108 based on parameters (also AV parameters) of a use case 118.

By way of example, use case 118 may include a provisioning request 120 issued to conduct stress testing. In such instances, provisioning request 120 can include information/instructions to cause bot orchestrator 114 to instantiate many AV bots 118 (e.g., the quantity may be specified by an AV parameter in the provisioning request). The performance of fleet management system 110, which also interfaces with real-world AV 106, may be stress tested by interfacing with the instantiated AV bots 108. By way of example, dispatch and fleet management subsystems (not illustrated) of management system 110 can be monitored to understand how they respond to sudden increases in AV loads, e.g., that are introduced by the instantiation of multiple new AV bots.

In another example, use case 118 may include one or more Continuous Integration/Continuous Delivery (CI/CD) tests designed to test the integration of new software updates (or code changes), for example, to the user ride hailing app. In some aspects, CI/CD testing can be scheduled, or can be automated/conditioned on the occurrence of some pre-determined event, such as a code change. By way of example, CI/CD testing may be used to test aspects of the rider/user journey, e.g., via the ride haling app, without interacting with a physical AV. Additionally, CI/CD tests may be run to test interactions/functionality of AV back-end systems (e.g., fleet management system 110, vehicle comms 112, and/or remote assistance system 116) through the provisioning of one or more AV bots 108. Once CI/CD testing is complete, the (automated) testing process can decommission the AV bot/s 108, for example, so they can be used for another purpose. As such, CI/CD testing can use AV bot orchestrator 114 to monitor the impact of code changes made to any (or all) of the AVs support system, user app, and/or infrastructure, etc.

In some aspects, use cases 118 can include continuous tests that are run/performed on an ongoing basis, for example, to test various user journeys and/or business operations, etc. As compared to CI/CD tests, continuous tests can be performed constantly or periodically, on an ongoing basis, for example, even if no code changes or other specific pre-conditions are met. In another example, use case 118 may include canary testing where a subset of users is selected to receive new software changes while a different subset of users is provided with previous/different versions of software. For example, AV bot orchestrator 114 may instantiate AV bots 118 based on different versions of software (e.g., different versions of provision AV bot 120, AV bot API 122, delete AV bot 124).

In some aspects, parameters associated with a given AV bot (e.g., AV bot 108), such as those indicating location, pose, and/or AV state information (e.g., speed, heading, open doors, occupied seats, system status indicators), etc., may be modified to test how fleet management system 110, vehicle coms 112, and/or remote assistance system 116 respond. By way of example, detected security breaches, such as the unauthorized occupancy of an AV cabin (e.g., as detected by seat-occupancy sensors) may be simulated by updating certain AV parameters. Such AV state changes can be used to test how communication with fleet management system 110 and/or remote assistance system 116 (e.g., via vehicle comms 112) are handled. Further details regarding the update of AV bot parameters, e.g., via an AV bot API, are discussed in further detail with respect to FIG. 2, below.

Once AV bot testing is completed or concluded, developer 126 may submit a deletion request 124 to bot orchestrator 114 to delete or remove one or more AV bots 108 as needed. In some implementations, the instantiation, testing, and/or deletion of AV bots may be performed based on a pre-determined schedule, e.g., such that instantiation of AV bots, testing by AV bots, and deletion of AV bots may be performed automatically, e.g., based on an tasks of an automated scheduler.

Figure 2:
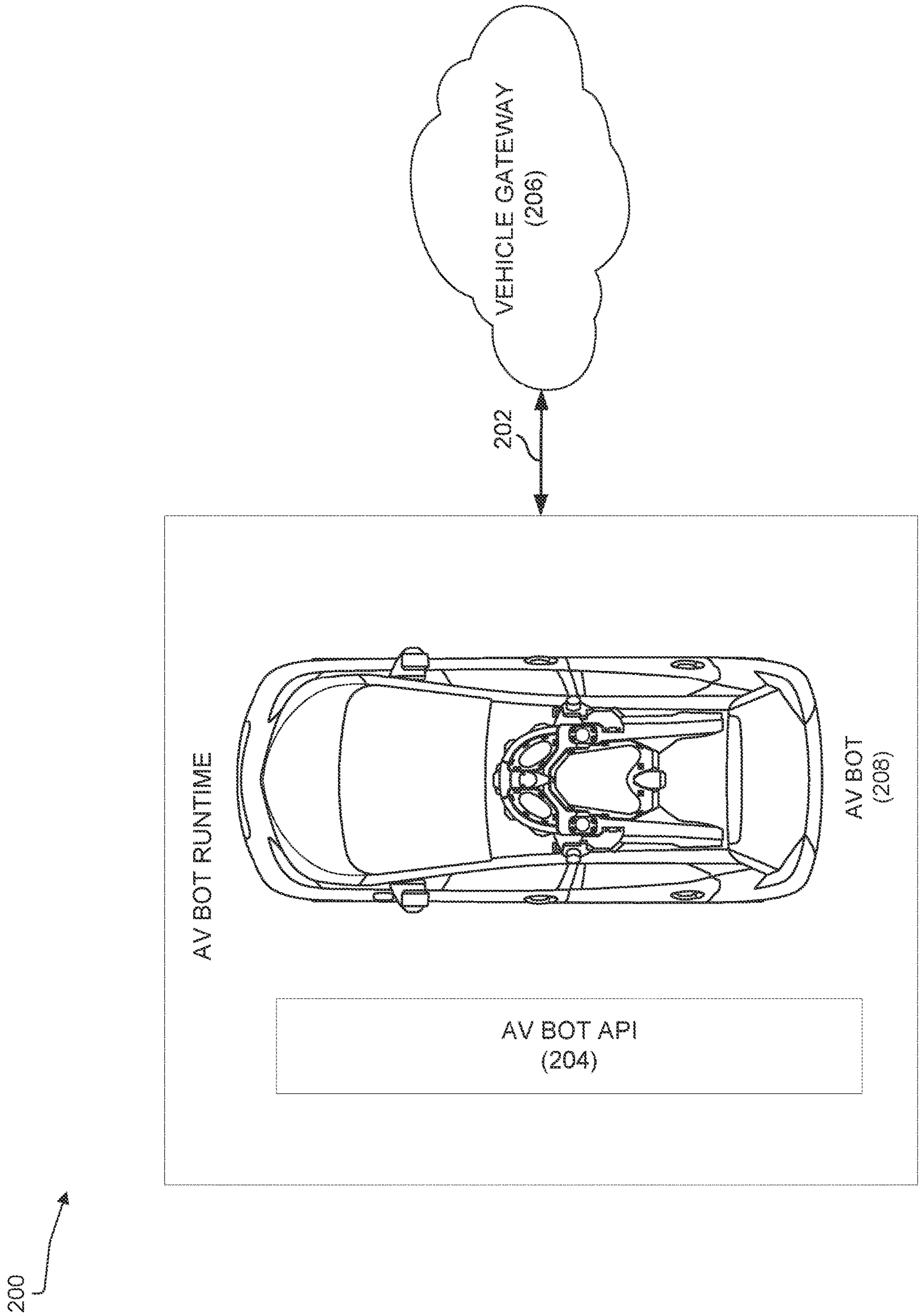
FIG. 2 illustrates an Application Programming Interface (API) diagram of example communications between an AV bot and a vehicle gateway system, according to some aspects of the disclosed technology.

FIG. 2 illustrates an Application Programming Interface (API) diagram 200 of example communications between an AV bot 208 and a vehicle gateway system 206. As discussed above with respect to FIG. 1, a bot orchestrator can receive a provisioning request (e.g., from a developer testing a use case) specifying one or more AV parameters. By way of example, a user (e.g., developer 126 as illustrated in FIG. 1) can utilize AV bot API 204 to interrogate parameters for a use case and to configure AV bot 208. In some cases, AV bot API 204 may be integrated into a bot orchestrator. In the example of a stress test use case, AV parameters can include a quantity of AV bot 208. Additional examples of AV parameters for various use cases may include seat occupancy (e.g., the number of passengers seated in AV bot 208), cargo status (e.g., the cargo AV bot 208 is carrying, such as in a delivery request), open/close status for doors and/or trunk access (e.g., one or more doors of AV bot 208 may be left open), heading, speed, route, internal AV state (e.g., the status and performance of the electronics, mechanical parts and features of AV bot 208), internal health state (e.g., health or mechanical status various of AV bot 208), notifications (e.g., AV bot 208 may notify vehicle gateway 206 regarding an observed weather condition such as rain or information on another use case such as door open close status), or location of AV bot 208. Those skilled in the art will appreciate additional examples of AV parameters to configure AV bot 208.

Based on the AV parameters specified by the provisioning request, the bot orchestrator can instantiate and configure AV bot 208. A vehicle gateway 206 as illustrated in FIG. 2 may represent a fleet management system 110 as illustrated in FIG. 1 or any other backend system capable of interfacing with real-world AVs (e.g., AV 106). The AV bot 208 may use interface 202 to communicate (e.g., send state updates, receive inbound commands) with vehicle gateway 206.

Figure 3:
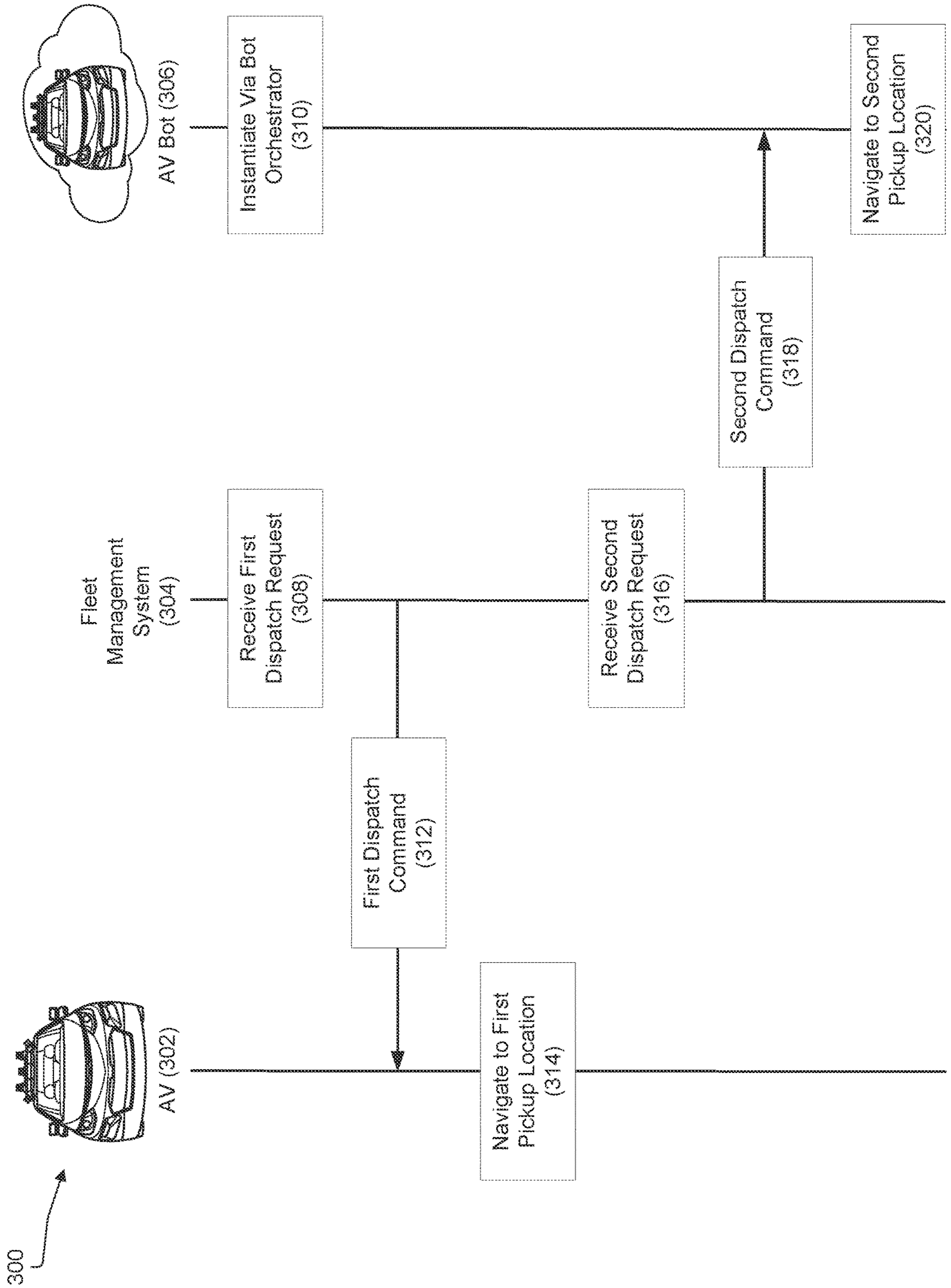
FIG. 3 illustrates a signaling diagram of example communications between an AV, an AV bot, and fleet management system, according to some aspects of the disclosed technology.

FIG. 3 illustrates a signaling diagram 300 of example communications between an AV 302, AV bot 306, and fleet management system 306. At block 308, fleet management system 304 receives a first dispatch request. As discussed above with respect to FIG. 1, a user may request (e.g., via a smartphone) a ridehail or delivery which is subsequently received by fleet management system 304. At block 310, AV bot 306 can be instantiated and configured via a bot orchestrator 310. As discussed above with respect to FIG. 1 and FIG. 2, an API may be used to interrogate AV parameters (e.g., based on a use case or desired test). The bot orchestrator may instantiate (block 310) and configure AV bot 306 based on the interrogated AV parameters.

Based on the received first dispatch request (block 308), fleet management system 304 can send a first dispatch command (block 312) to AV 302. For example, fleet management system 304 may select an AV 302 from among a fleet of AVs to allocate to a user. The selection process of the fleet management system can be based on any of a variety of constraints, including, but not limited to, vehicle availability, vehicle type, user preference information and/or route optimization (e.g., a distance of an AV to the user pick-up location specified by the ridehail request). The fleet management system 304 can then send a dispatch command (block 312) (e.g., via a vehicle communication system) to AV 302.

Based on first dispatch command (block 312) received from fleet management system 304, AV 302 can navigate to a first pick-up location (block 314) to pick-up the user that made the ridehail request. At block 316, fleet management system 304 can receive a second dispatch request. In some examples, a software developer (e.g., developer 126) that sent a provisioning request to a bot orchestrator to instantiate and configure AV bot 306 (e.g., based on a tested use case) can also submit a dispatch request (i.e., second dispatch request) to fleet management system 304.

Based on the received second dispatch request (block 316), a second dispatch command can be sent by fleet management system 304 to AV bot 306. In some aspects, since the same fleet management system 304 that interfaces with real-world AV 302 also interfaces with software-developed AV bot 306, a developer can test different scenarios and use cases to assess the performance of fleet management system 304. In other words, a developer may instantiate and configure (e.g., based on AV parameters and using a bot orchestrator) AV bot 306 to test use cases that may be difficult to test with real-world AV 302. At block 320, AV bot 306 may navigate to a pick-up location (i.e., second pick-up location) as specified by the AV parameters (e.g., interrogated from a use case). In other words, a developer can configure the second pick-up location as an AV parameter via an API as illustrated above in FIG. 2.

Figure 4:
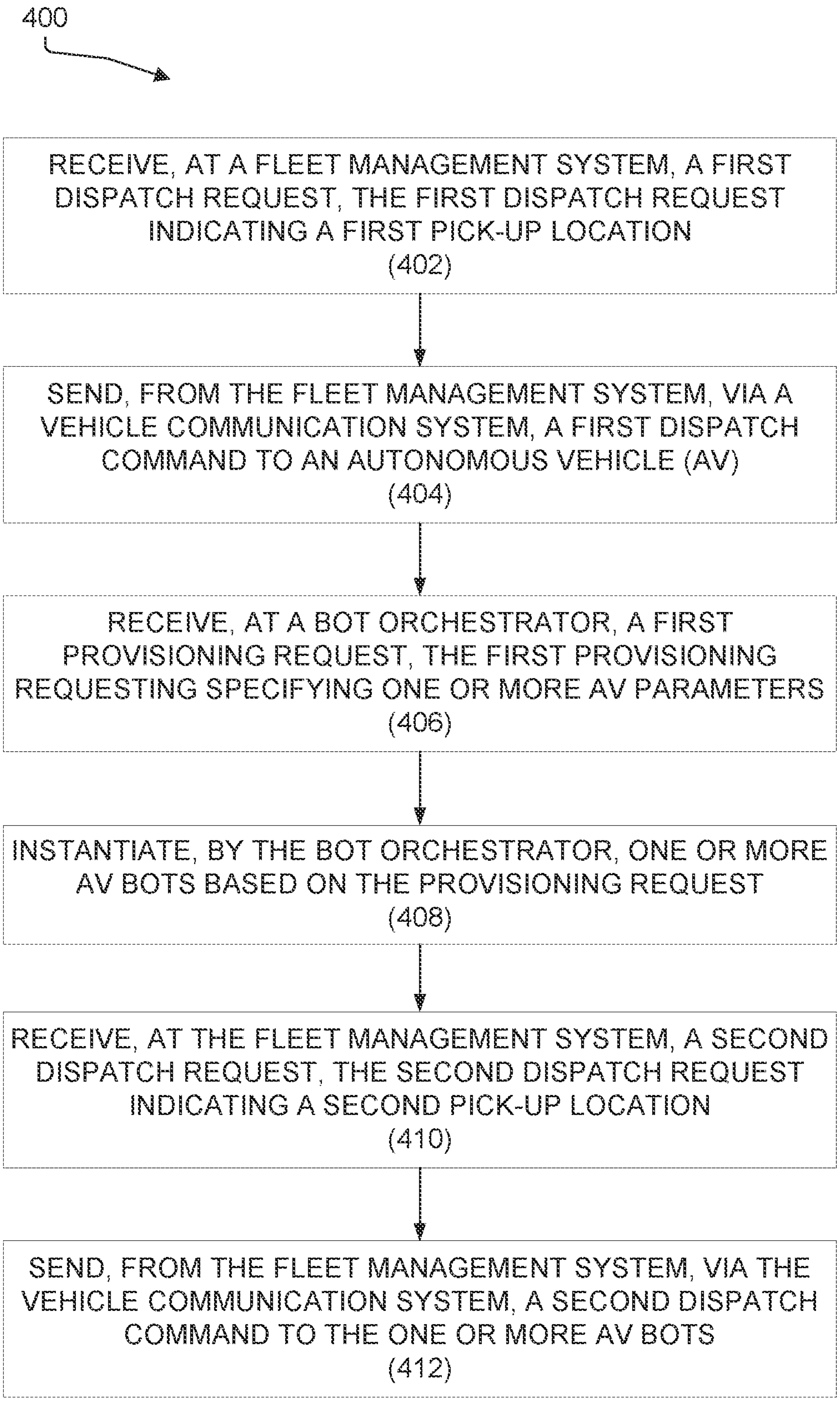
FIG. 4 illustrates an example process for dispatching an AV and AV bot, according to some aspects of the disclosed technology.

FIG. 4 illustrates an example process 400 for dispatching an AV and AV bot, such as AV 106 and AV bot 108, discussed above with respect to FIG. 1. As step 402, process 400 includes receiving, at a fleet management system, a first dispatch request, the first dispatch request indicating a first pick-up location for a first ridehailing request. In some aspects, when a user submits a ridehail request via a smartphone, the user's pick-up location (e.g., which may be determined from the GPS or GNSS receiver on the smartphone) and a dispatch request can be sent to a fleet management system (e.g., fleet management system 110 as illustrated in FIG. 1).

At step 404, process 400 includes sending, from the fleet management system, via a vehicle communication system, a first dispatch command to an autonomous vehicle (AV), wherein the first dispatch command is configured to cause the AV to navigate to the first pick-up location and to provide entry to a passenger associated with the first dispatch request. The fleet management system may allocate an AV to a user, or passenger, based on availability or route optimization. By way of example, the fleet management system may command the allocated AV via a vehicle communication system (e.g., vehicle communication system 112 as illustrated in FIG. 1) to navigate to the location of the user, or passenger, for a pick-up.

At step 406, process 400 includes receiving, at a bot orchestrator, a first provisioning request, the first provisioning requesting specifying one or more AV parameters. As discussed above, a bot orchestrator (e.g., AV bot orchestrator 114 as illustrated in FIG. 1) may receive a provisioning request based on one or more AV parameters. The one or more AV parameters may be derived from a particular use case (e.g., use cases 118 as illustrated in FIG. 1).

At step 408, process 400 includes instantiating, by the bot orchestrator, one or more AV bots based on the provisioning request, wherein the one or more AV bots are configured based on the one or more AV parameters. An API (e.g., AV bot API 204 as illustrated in FIG. 2) may be used to configure AV bots based on one or more AV parameters. The bot orchestrator may instantiate one or more AV bots based on the provisioning request and configure them based on the AV parameters of a particular use case.

At step 410, process 400 includes receiving, at the fleet management system, a second dispatch request, the second dispatch request indicating a second pick-up location for a second ridehailing request. In some aspects, a developer may configure a pick-up location of a user as one of the AV parameters, for example, as part of a CI/CD test, as discussed above.

At step 412, process 400 includes sending, from the fleet management system, via the vehicle communication system, a second dispatch command to the one or more AV bots, wherein the second dispatch command is configured to provide the second pick-up location to the one or more AV bots. The fleet management system may send a dispatch command to the AV bot that includes a pick-up location of where the AV bot will navigate to.

In some examples, process 400 includes receiving, at the bot orchestrator, a deletion request specifying deletion of a subset of the one or more AV bots. A developer may send a command (e.g., delete AV bot 124) to the bot orchestrator to delete one or more of the instantiated AV bots. In some examples, process 400 includes receiving, at a remote assistance system, a request for assistance for the one or more AV bots, wherein the request for assistance is sent from the fleet management system via the vehicle communication system, and wherein the request for assistance is received by a remote operator at a remote location. If an AV or AV bot is unable to autonomously navigate through a driving scenario, the AV or AV bot may transmit a request for assistance. A remote assistance system (e.g., remote assistance system 116 as illustrated in FIG. 1) may communicate with a remote operator (e.g., an operator physically located at a remote location) that can provide commands and/or instructions to the AV indicating maneuvers and/or paths to navigate through the driving scenario.

Figure 5:
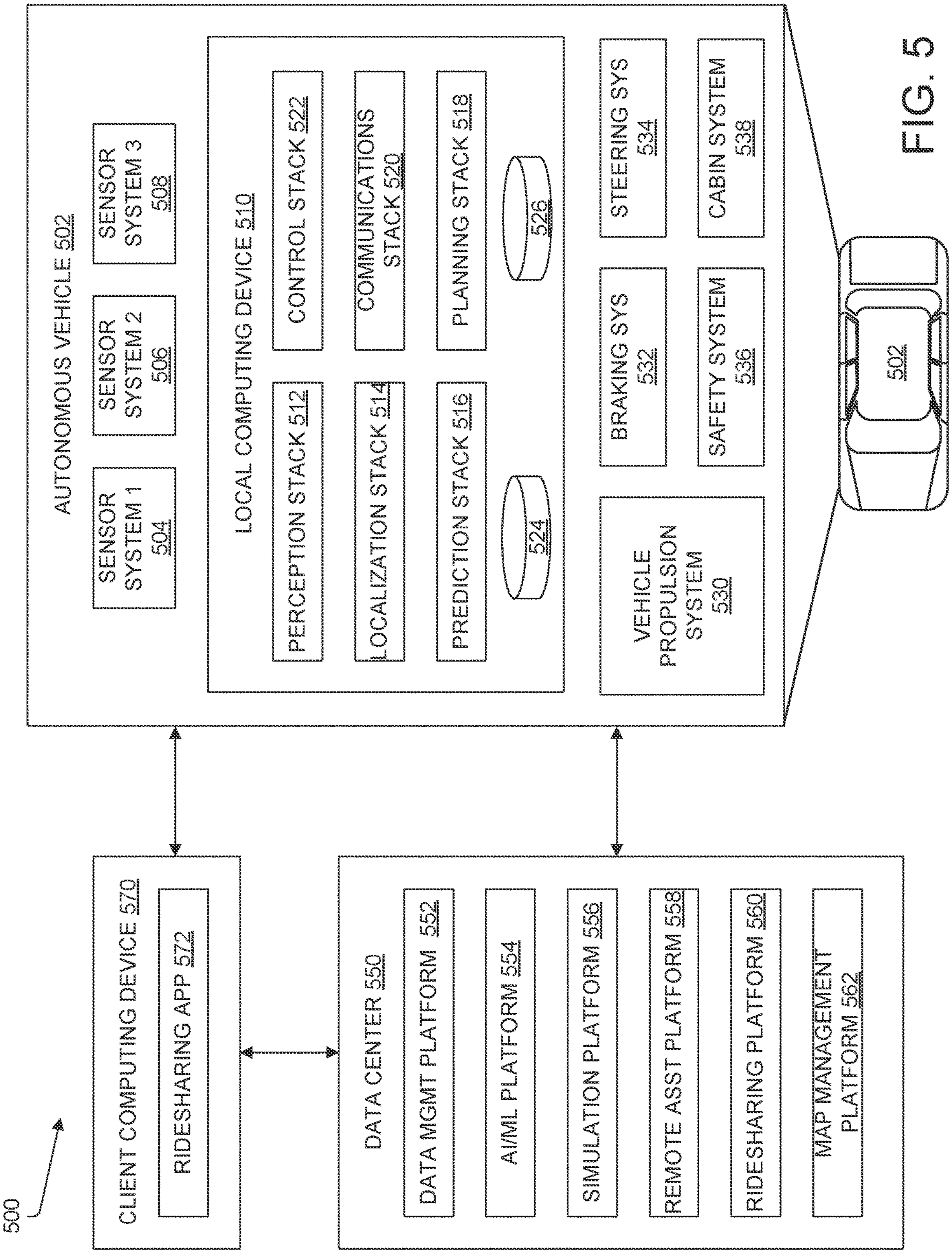
FIG. 5 illustrates an example system environment that can be used to facilitate autonomous vehicle (AV) dispatch and navigation operations, according to some aspects of the disclosed technology.

FIG. 5 is a diagram illustrating an example autonomous vehicle (AV) environment 500, according to some examples of the present disclosure. One of ordinary skill in the art will understand that, for AV environment 500 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other examples may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a localization stack 514, a prediction stack 516, a planning stack 518, a communications stack 520, a control stack 522, an AV operational database 524, and an HD geospatial database 526, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the perception stack 512 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

Prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

Planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

Control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

Communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

Data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ride-hailing service (e.g., a ridesharing service), a delivery service, a remote/roadside assistance service, street services (e.g., street mapping, street patrol, street cleaning, street metering, parking reservation, etc.), and the like.

Data center 550 can send and receive various signals to and from the AV 502 and the client computing device 570. These signals can include sensor data captured by the sensor systems 504-508, roadside assistance requests, software updates, ride-hailing/ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ride-hailing platform 560, and a map management platform 562, among other systems.

Data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ride-hailing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

Simulation platform 556 can enable testing and validation of the algorithms, machine learning models, neural networks, and other development efforts for the AV 502, the remote assistance platform 558, the ride-hailing platform 560, the map management platform 562, and other platforms and systems. Simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

Remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

Ride-hailing platform 560 can interact with a customer of a ride-hailing service via a ride-hailing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 572. The client computing device 570 can be a customer's mobile computing device or a computing device integrated with the AV 502 (e.g., the local computing device 510). The ride-hailing platform 560 can receive requests to pick up or drop off from the ride-hailing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ride-hailing platform 560 may incorporate the map viewing services into the client application 572 to enable passengers to view the AV 502 in transit en route to a pick-up or drop-off location, and so on.

While the autonomous vehicle 502, the local computing device 510, and the autonomous vehicle environment 500 are shown to include certain systems and components, one of ordinary skill will appreciate that the autonomous vehicle 502, the local computing device 510, and/or the autonomous vehicle environment 500 can include more or fewer systems and/or components than those shown in FIG. 5. For example, the autonomous vehicle 502 can include other services than those shown in FIG. 5 and the local computing device 510 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 5. An illustrative example of a computing device and hardware components that can be implemented with the local computing device 510 is described below with respect to FIG. 6.

Figure 6:
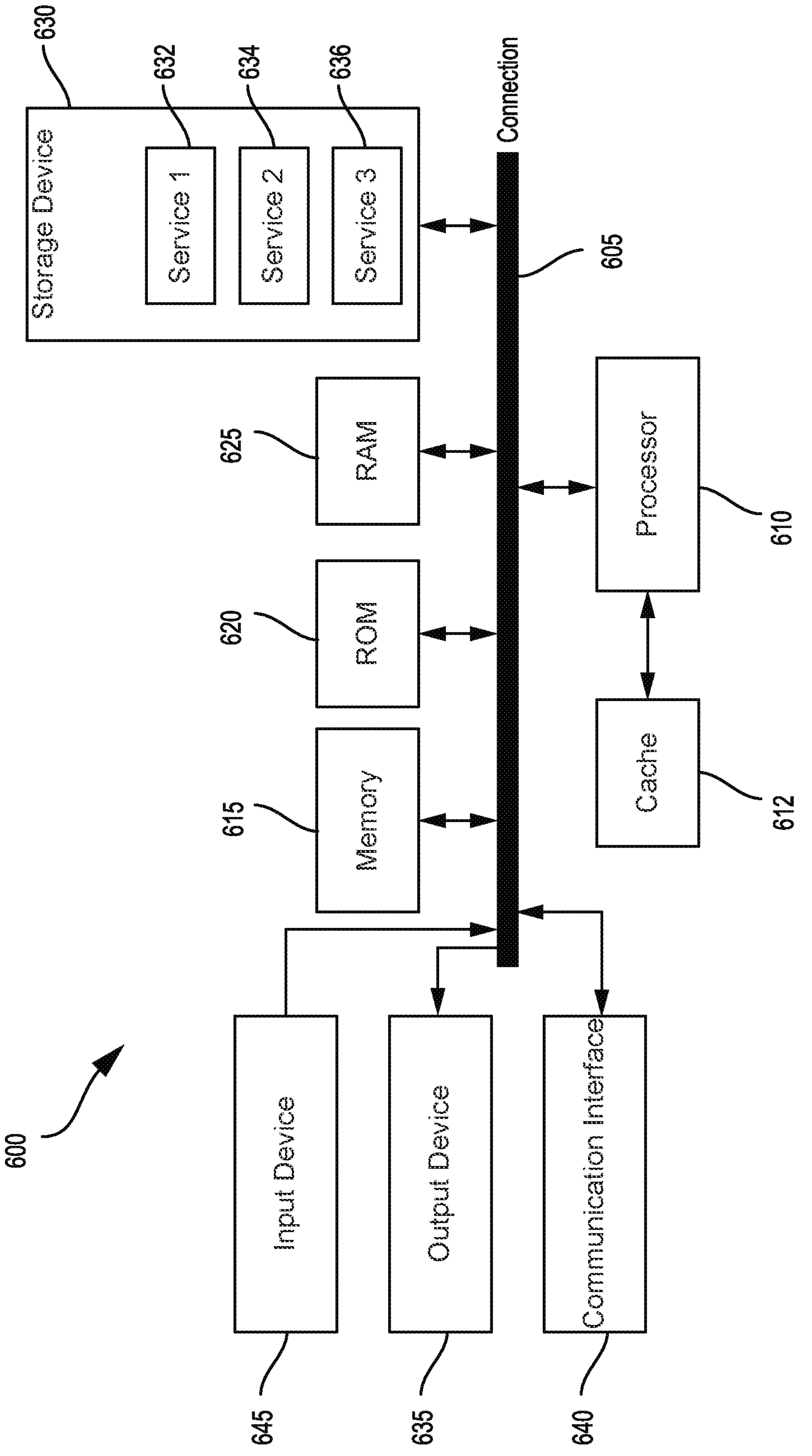
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Illustrative examples of the disclosure include:

Aspect 1. An apparatus comprising: at least one memory; and at least one processor coupled to the at least one memory, the at least one processor configured to: receive, at a fleet management system, a first dispatch request, the first dispatch request indicating a first pick-up location for a first ridehailing request; send, from the fleet management system, via a vehicle communication system, a first dispatch command to an autonomous vehicle (AV), wherein the first dispatch command is configured to cause the AV to navigate to the first pick-up location and to provide entry to a passenger associated with the first dispatch request; receive, at a bot orchestrator, a first provisioning request, the first provisioning requesting specifying one or more AV parameters; instantiate, by the bot orchestrator, one or more AV bots based on the provisioning request, wherein the one or more AV bots are configured based on the one or more AV parameters; receive, at the fleet management system, a second dispatch request, the second dispatch request indicating a second pick-up location for a second ridehailing request; and send, from the fleet management system, via the vehicle communication system, a second dispatch command to the one or more AV bots, wherein the second dispatch command is configured to provide the second pick-up location to the one or more AV bots.

Aspect 2. The apparatus of Aspect 1, wherein the at least one processor is further configured to: receive, at the bot orchestrator, a deletion request specifying deletion of a subset of the one or more AV bots.

Aspect 3. The apparatus of any of Aspects 1-2, wherein the one or more AV parameters comprise at least one of a quantity, seat occupancy, cargo status, door open close status, heading, speed, route, internal AV state, or location of the one or more AV bots.

Aspect 4. The apparatus of any of Aspects 1-3, wherein the at least one processor is further configured to: receive, at a remote assistance system, a request for assistance for the one or more AV bots.

Aspect 5. The apparatus of Aspect 4, wherein the request for assistance is sent from the fleet management system via the vehicle communication system.

Aspect 6. The apparatus of Aspect 4, wherein the request for assistance is received by a remote operator at a remote location.

Aspect 7. The apparatus of any of Aspects 1-6, wherein the at least one processor is further configured to: receive, at a remote assistance system, a second request for assistance for the AV.

Aspect 8. A computer-implemented method comprising: receiving, at a fleet management system, a first dispatch request, the first dispatch request indicating a first pick-up location for a first ridehailing request; sending, from the fleet management system, via a vehicle communication system, a first dispatch command to an autonomous vehicle (AV), wherein the first dispatch command is configured to cause the AV to navigate to the first pick-up location and to provide entry to a passenger associated with the first dispatch request; receiving, at a bot orchestrator, a first provisioning request, the first provisioning requesting specifying one or more AV parameters; instantiating, by the bot orchestrator, one or more AV bots based on the provisioning request, wherein the one or more AV bots are configured based on the one or more AV parameters; receiving, at the fleet management system, a second dispatch request, the second dispatch request indicating a second pick-up location for a second ridehailing request; and sending, from the fleet management system, via the vehicle communication system, a second dispatch command to the one or more AV bots, wherein the second dispatch command is configured to provide the second pick-up location to the one or more AV bots.

Aspect 9. The computer-implemented method of Aspect 8, further comprising: receiving, at the bot orchestrator, a deletion request specifying deletion of a subset of the one or more AV bots.

Aspect 10. The computer-implemented method of any of Aspects 8-9, wherein the one or more AV parameters comprise at least one of a quantity, seat occupancy, cargo status, door open close status, heading, speed, route, internal AV state, or location of the one or more AV bots.

Aspect 11. The computer-implemented method of any of Aspects 8-10, further comprising: receiving, at a remote assistance system, a request for assistance for the one or more AV bots.

Aspect 12. The computer-implemented method of Aspect 11, wherein the request for assistance is sent from the fleet management system via the vehicle communication system.

Aspect 13. The computer-implemented method of Aspect 11, wherein the request for assistance is received by a remote operator at a remote location.

Aspect 14. The computer-implemented method of any of Aspects 8-13, further comprising: receiving, at a remote assistance system, a second request for assistance for the AV.

Aspect 15. A non-transitory computer-readable storage medium comprising at least one instruction for causing a computer or processor to: receive, at a fleet management system, a first dispatch request, the first dispatch request indicating a first pick-up location for a first ridehailing request; send, from the fleet management system, via a vehicle communication system, a first dispatch command to an autonomous vehicle (AV), wherein the first dispatch command is configured to cause the AV to navigate to the first pick-up location and to provide entry to a passenger associated with the first dispatch request; receive, at a bot orchestrator, a first provisioning request, the first provisioning requesting specifying one or more AV parameters; instantiate, by the bot orchestrator, one or more AV bots based on the provisioning request, wherein the one or more AV bots are configured based on the one or more AV parameters; receive, at the fleet management system, a second dispatch request, the second dispatch request indicating a second pick-up location for a second ridehailing request; and send, from the fleet management system, via the vehicle communication system, a second dispatch command to the one or more AV bots, wherein the second dispatch command is configured to provide the second pick-up location to the one or more AV bots.

Aspect 16. The non-transitory computer-readable storage medium of Aspect 15, wherein the at least one instruction is further configured to cause the computer or processor to: receive, at the bot orchestrator, a deletion request specifying deletion of a subset of the one or more AV bots.

Aspect 17. The non-transitory computer-readable storage medium of any of Aspects 15-16, wherein the one or more AV parameters comprise at least one of a quantity, seat occupancy, cargo status, door open close status, heading, speed, route, internal AV state, or location of the one or more AV bots.

Aspect 18. The non-transitory computer-readable storage medium of any of Aspects 15-17, wherein the at least one instruction is further configured to cause the computer or processor to: receive, at a remote assistance system, a request for assistance for the one or more AV bots.

Aspect 19. The non-transitory computer-readable storage medium of Aspect 18, wherein the request for assistance is sent from the fleet management system via the vehicle communication system.

Aspect 20. The non-transitory computer-readable storage medium of Aspect 18, wherein the request for assistance is received by a remote operator at a remote location.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus comprising:

at least one memory; and at least one processor coupled to the at least one memory, the at least one processor configured to:

receive, at a fleet management system, a first dispatch request, the first dispatch request indicating a first pick-up location for a first ridehailing request;

send, from the fleet management system, via a vehicle communication system, a first dispatch command to an autonomous vehicle (AV), wherein the first dispatch command is configured to cause the AV to navigate to the first pick-up location and to provide entry to a passenger associated with the first dispatch request;

receive, at a bot orchestrator, a provisioning request, the provisioning request specifying one or more AV parameters comprising at least one of an open door status, a seat occupancy status, or an internal health state;

instantiate, by the bot orchestrator, one or more AV bots based on the provisioning request, wherein the one or more AV bots are configured based on the one or more AV parameters;

perform, using the one or more AV bots, a test on the fleet management system, wherein the one or more AV bots interface with the same fleet management system that dispatches the AV while the fleet management system dispatches the AV to navigate to the first pick-up location, and wherein performing the test comprises:

receiving, at the fleet management system, a second dispatch request, the second dispatch request indicating a second pick-up location for a second ridehailing request; and sending, from the fleet management system, via the vehicle communication system, a second dispatch command to the one or more AV bots, wherein the second dispatch command is configured to provide the second pick-up location to the one or more AV bots; and after performing the test on the fleet management system, deleting, by the bot orchestrator, the one or more AV bots based on a pre-determined schedule.

2. The apparatus of claim 1, wherein the at least one processor is further configured to receive, at the bot orchestrator, a deletion request specifying deletion of a subset of the one or more AV bots.

3. The apparatus of claim 1, wherein the one or more AV parameters further comprise at least one of a quantity, cargo status, heading, speed, route, or location of the one or more AV bots.

4. The apparatus of claim 1, wherein the at least one processor is further configured to receive, at a remote assistance system, a request for assistance for the one or more AV bots.

5. The apparatus of claim 4, wherein the request for assistance is sent from the fleet management system via the vehicle communication system.

6. The apparatus of claim 4, wherein the request for assistance is received by a remote operator at a remote location.

7. The apparatus of claim 1, wherein the at least one processor is further configured to receive, at a remote assistance system, a second request for assistance for the AV.

8. A computer-implemented method comprising:

receiving, at a fleet management system, a first dispatch request, the first dispatch request indicating a first pick-up location for a first ridehailing request;

sending, from the fleet management system, via a vehicle communication system, a first dispatch command to an autonomous vehicle (AV), wherein the first dispatch command is configured to cause the AV to navigate to the first pick-up location and to provide entry to a passenger associated with the first dispatch request;

receiving, at a bot orchestrator, a provisioning request, the provisioning request specifying one or more AV parameters comprising at least one of an open door status, a seat occupancy status, or an internal health state;

instantiating, by the bot orchestrator, one or more AV bots based on the provisioning request, wherein the one or more AV bots are configured based on the one or more AV parameters;

performing, using the one or more AV bots, a test on the fleet management system, wherein the one or more AV bots interface with the same fleet management system that dispatches the AV while the fleet management system dispatches the AV to navigate to the first pick-up location, and wherein performing the test comprises:

receiving, at the fleet management system, a second dispatch request, the second dispatch request indicating a second pick-up location for a second ride-hailing request; and sending, from the fleet management system, via the vehicle communication system, a second dispatch command to the one or more AV bots, wherein the second dispatch command is configured to provide the second pick-up location to the one or more AV bots; and after performing the test on the fleet management system, deleting, by the bot orchestrator, the one or more AV bots based on a pre-determined schedule.

9. The computer-implemented method of claim 8, further comprising receiving, at the bot orchestrator, a deletion request specifying deletion of a subset of the one or more AV bots.

10. The computer-implemented method of claim 8, wherein the one or more AV parameters further comprise at least one of a quantity, cargo status, heading, speed, route, or location of the one or more AV bots.

11. The computer-implemented method of claim 8, further comprising receiving, at a remote assistance system, a request for assistance for the one or more AV bots.

12. The computer-implemented method of claim 11, wherein the request for assistance is sent from the fleet management system via the vehicle communication system.

13. The computer-implemented method of claim 11, wherein the request for assistance is received by a remote operator at a remote location.

14. The computer-implemented method of claim 8, further comprising receiving, at a remote assistance system, a second request for assistance for the AV.

15. A non-transitory computer-readable storage medium comprising at least one instruction for causing a computer or processor to:

receive, at a fleet management system, a first dispatch request, the first dispatch request indicating a first pick-up location for a first ridehailing request;

send, from the fleet management system, via a vehicle communication system, a first dispatch command to an autonomous vehicle (AV), wherein the first dispatch command is configured to cause the AV to navigate to the first pick-up location and to provide entry to a passenger associated with the first dispatch request;

receive, at a bot orchestrator, a provisioning request, the provisioning request specifying one or more AV parameters comprising at least one of an open door status, a seat occupancy status, or an internal health state;

instantiate, by the bot orchestrator, one or more AV bots based on the provisioning request, wherein the one or more AV bots are configured based on the one or more AV parameters;

perform, using the one or more AV bots, a test on the fleet management system, wherein the one or more AV bots interface with the same fleet management system that dispatches the AV while the fleet management system dispatches the AV to navigate to the first pick-up location, and wherein performing the test comprises:

receiving, at the fleet management system, a second dispatch request, the second dispatch request indicating a second pick-up location for a second ride-hailing request; and sending, from the fleet management system, via the vehicle communication system, a second dispatch command to the one or more AV bots, wherein the second dispatch command is configured to provide the second pick-up location to the one or more AV bots; and after performing the test on the fleet management system, deleting, by the bot orchestrator, the one or more AV bots based on a pre-determined schedule.

16. The non-transitory computer-readable storage medium of claim 15, wherein the at least one instruction is further configured to cause the computer or processor to receive, at the bot orchestrator, a deletion request specifying deletion of a subset of the one or more AV bots.

17. The non-transitory computer-readable storage medium of claim 15, wherein the one or more AV parameters further comprise at least one of a quantity, cargo status, heading, speed, route, or location of the one or more AV bots.

18. The non-transitory computer-readable storage medium of claim 15, wherein the at least one instruction is further configured to cause the computer or processor to receive, at a remote assistance system, a request for assistance for the one or more AV bots.

19. The non-transitory computer-readable storage medium of claim 18, wherein the request for assistance is sent from the fleet management system via the vehicle communication system.

20. The non-transitory computer-readable storage medium of claim 18, wherein the request for assistance is received by a remote operator at a remote location.

* * * * *